United States Patent
Qureshi et al.

(10) Patent No.: US 10,922,732 B1
(45) Date of Patent: Feb. 16, 2021

(54) PROCESS AND MACHINE FOR MEDIA DETERMINATION USING PRODUCT INFORMATION

(71) Applicant: Amazon Technologies, Inc., Seattle, WA (US)

(72) Inventors: Aneeb Naveed Qureshi, Seattle, WA (US); Songqing Cai, Sammish, WA (US); Jason Juin-Yip Kwok, Seattle, WA (US); Xuping Zhang, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1302 days.

(21) Appl. No.: 14/870,689

(22) Filed: Sep. 30, 2015

(51) Int. Cl.
*G06Q 30/00* (2012.01)
*G06Q 30/06* (2012.01)
*G06F 16/732* (2019.01)
*G06F 16/783* (2019.01)
*G06F 16/9535* (2019.01)

(52) U.S. Cl.
CPC ..... *G06Q 30/0623* (2013.01); *G06F 16/7328* (2019.01); *G06F 16/7837* (2019.01); *G06F 16/9535* (2019.01); *G06Q 30/0605* (2013.01); *G06Q 30/0631* (2013.01); *G06Q 30/0641* (2013.01)

(58) Field of Classification Search
CPC ................ G06Q 30/0601–0645; G06Q 30/08
USPC ............................................... 705/26.1–27.2
See application file for complete search history.

(56) References Cited

U.S. PATENT DOCUMENTS

| | | | |
|---|---|---|---|
| 7,657,540 B1* | 2/2010 | Bayliss | G06F 16/283 707/999.1 |
| 2010/0076867 A1* | 3/2010 | Inoue | G06Q 30/0282 705/26.1 |
| 2011/0314030 A1* | 12/2011 | Burba | G06F 16/9535 707/749 |
| 2014/0164283 A1* | 6/2014 | Avedissian | H04N 21/44016 705/347 |

(Continued)

OTHER PUBLICATIONS

Sullivan, Laurie, CPG Brands Getting Better at Building Cross-Category Relationships With Online Shoppers, Jan. 21, 2015, mediapost.com, accessed at [https://www.mediapost.com/publications/article/242194/cpg-brands-getting-better-at-building-cross-catego.html] (Year: 2015).*

*Primary Examiner* — Jeffrey A. Smith
*Assistant Examiner* — Lindsey B Smith
(74) *Attorney, Agent, or Firm* — Eversheds Sutherland (US) LLP (57) ABSTRACT

Recommendations for media assets based on product similarities are provided. In some embodiments, a recommendation can be determined using asset-to-asset similarity information that can be obtained by mapping media assets to products and further mapping products to media assets based at least on the prior mapping. In addition, product similarity information can be leveraged to generate groups of media assets for different categories of similarity present in the product similarity information. Such groups can be identified, for example, by using the mapped products to media assets as applied to the different categories. Further a diverse arrangement of media assets can be generated by selecting media assets from the groups according to a defined selection rule.

12 Claims, 7 Drawing Sheets

(56) References Cited

U.S. PATENT DOCUMENTS

2014/0172627 A1* 6/2014 Levy .................. G06Q 30/0631
705/26.7

* cited by examiner

PROCESS AND MACHINE FOR MEDIA DETERMINATION USING PRODUCT INFORMATION

BACKGROUND

Recommendations for media, such as videos or digital music, typically rely on consumer behavior in order to develop information related to media assets that may be preferred or otherwise enjoyed by an end-user. Access to greater scope of consumer behavior generally improves the ease which a recommendation for media is generated and provides with recommendations of greater quality. As such, lack of information related to consumer behavior can impair the generation of recommendations for media, which can yield poor recommendations.

BRIEF DESCRIPTION OF THE DRAWINGS

The accompanying drawings are an integral part of the disclosure and are incorporated into the subject specification. The drawings illustrate example embodiments of the disclosure and, in conjunction with the description and claims, serve to explain at least in part various principles, features, or aspects of the disclosure. Certain embodiments of the disclosure are described more fully below with reference to the accompanying drawings. However, various aspects of the disclosure can be implemented in many different forms and should not be construed as limited to the implementations set forth herein. Like numbers refer to like elements throughout.

DETAILED DESCRIPTION

The disclosure recognizes and addresses, in at least certain embodiments, the difficulty of generating quality recommendations for videos or other media in the absence of consumption behavior from an end-user. The disclosure provides devices, systems, and/or techniques for recommendations for media assets based on product similarities. Products can include consumer electronics, apparel, books, toys, and the like. In some embodiments, a recommendation can be determined using media-asset-to-media-asset relationships of other types of similarity information that can be obtained by mapping media assets to products and further mapping products to media assets based at least on the prior mapping. In addition, product-to-product relationships or other types of product similarity information can be leveraged to generate groups of media assets for different categories of similarity present in the product similarity information. Such groups can be identified, for example, by using the mapped products to media assets as applied to the different categories. Further a diverse arrangement of media assets can be generated by selecting media assets from the groups according to a defined selection rule. It is noted that while the disclosure is illustrated with reference to videos, such as short-form videos, the disclosure is not limited in this respect, and at least some embodiments of the disclosure can be implemented for any media asset besides a video.

Figure 1:
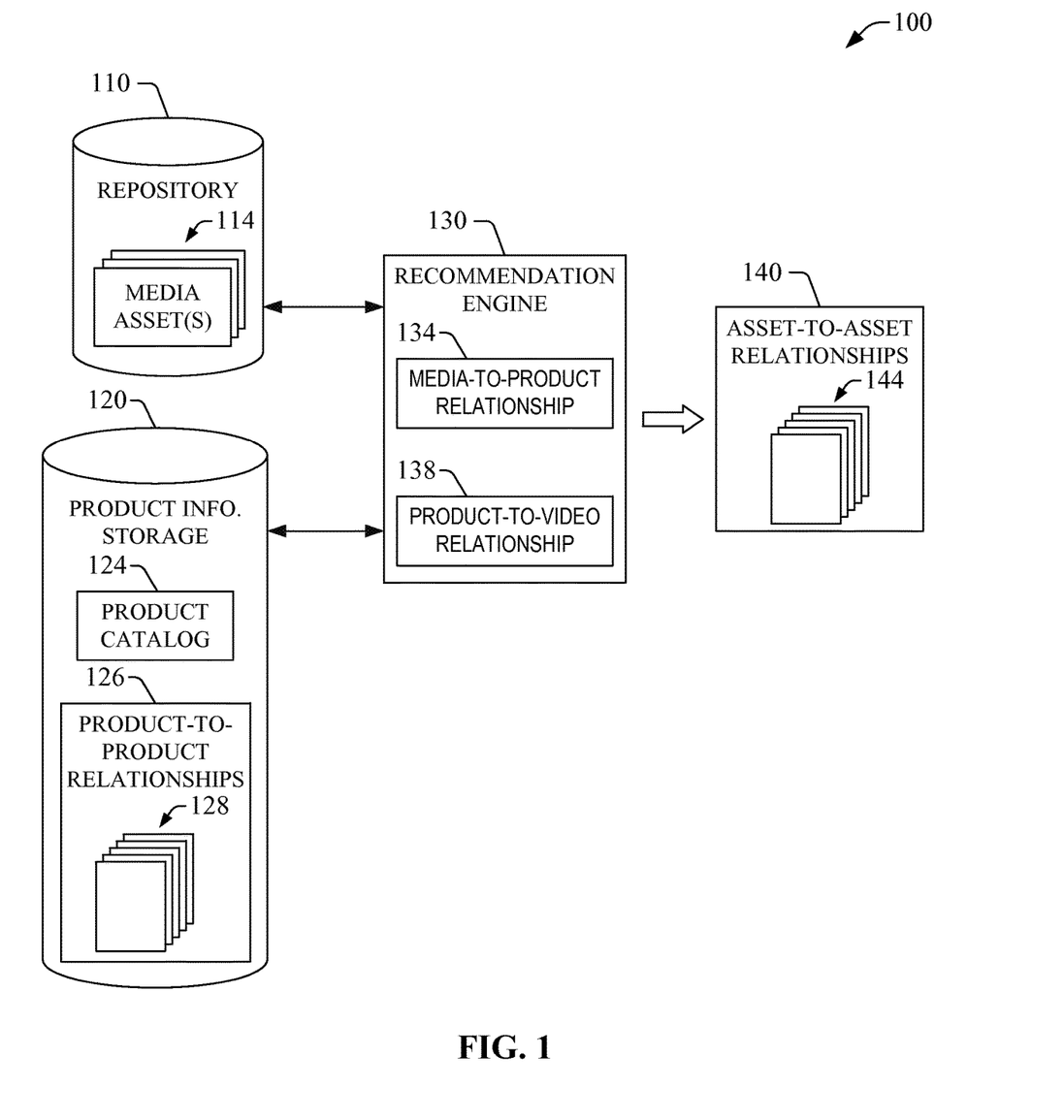
FIG. 1 presents an example of an operational environment in accordance with one or more aspects of the disclosure.

Referring to the drawings, FIG. 1 illustrates an example of an operational environment 100 in in accordance with one or more embodiments of the disclosure. The operational environment 100 can include one or more memory device 110 (which may be referred to as repository 110) that include one or more media assets 114. In some embodiments, the media assets can be embodied in or can include short-form videos, such as product reviews, DIY videos, cooking recipes, movie trailers, and the like. More generally, a media asset can include digital content (digital image(s), digital audio, combinations thereof, etc.) that can be consumed by a user device (e.g., a personal computer, a mobile device, such as smartphone or a tablet, or the like). One or more of the media assets of the media asset(s) 114 can be produced by a publisher, including a movie studio, a television studio, or a smaller production company. One or more other media assets of the media asset(s) 114 can include user-generated content. Regardless of the of the source, at least some of the media asset(s) 114 can include metadata indicative or otherwise representative of the content associated with a respective media asset. For instance, the metadata can include an asset identifier, such as internet movie database (IMDb) identifier, a title, a cast, or the like.

The operational environment also includes one or more other memory devices 120 (which may be referred to as product information storage 120) including product information. As illustrated, the product information storage 120 can include information 124 indicative or otherwise representative of a product catalog, and product-to-product relationships 126 (which also may be referred to as product similarity information 126), where each (or, in some embodiments, at least one) of the product-to-product relationships 126 can be indicative or otherwise representative of similar products. The product-to-product relationships can include one-to-many relationship(s), for example. The product-to-product relationships 126, or information associated therewith, can be arranged in categories 128, each representing a defined type of similarity between products. Similarity between products can be categorized according to, for example, consumption, purchase, session and view to purchase.

The operational environment 100 also includes a recommendation engine 130 that can generate video recommendations or other type of asset recommendation using or otherwise based on at least the product catalog 124 and/or the product-to-product relationships 126 (which also may be referred to as product similarity information 126). To that end, for example, the recommendation engine 130 can generate a media-to-product relationship 134 that can represent an association between a video (e.g., a short-form video) of the media asset(s) 114 and a product represented in the product catalog 124. In addition or in some embodiments, the recommendation engine 130 can generate a more general asset-to-product relationship. In some embodiments, to generate the media-to-product relationship 134, the recommendation engine 130 can utilize or otherwise leverage metadata associated with a media asset. As mentioned, such metadata can be indicative or otherwise representative of the media asset, and can be provided by a published or another type of source of the media asset. Specifically, in some examples, the recommendation engine 130 can generate or otherwise compose a search query having a regular expression including the metadata. In addition, the recommendation engine 130 can perform or can direct a search engine to perform a search for products using the search query. The recommendation engine 130 can generate a record indicative of an association between the metadata and a product found in the search. Such a record can be included in the media-to-product relationship 134. The recommendation engine 130 can perform searches for products represented in the product catalog 124 using regular expressions including metadata associated with a portion of the media asset(s) 114. Outcomes of the searches can form, for example, the media-to-product relationship 134.

The video-to-product relationship can be utilized or otherwise leveraged to generate a product-to-video relationship 138. In some embodiments, the recommendation engine 130 can invert the video-to-product relationship 134 in order determine the product-to-video relationship 138. Such an approach can permit determining the product-to-video relationship 138 without incurring the computational cost associated with generating a product-to-video relationship by traversing the product catalog 124 and, for a portion of the products, identifying related assets of the media asset(s) 114.

The product-to-video relationship 138 can permit leveraging the product-to-product relationships 126 to identify videos that can be deemed to be similar. Specifically, in some embodiments, for a defined category in the similarity information (e.g., "viewers who bought this product also bought"), the recommendation engine 130 can determine or otherwise identify one or more short-form videos associated with a product within the defined category by using the product-to-video relationship 138. By applying the product-to-video relationship 138, the recommendation engine 130 can generate a group of short-form videos for at least a portion of the products associated with the defined category. As such, in one aspect, the group of short-form videos can be characterized as similar in view of the similarity between the products that yield such a group.

For a defined short-form video, the recommendation engine 130 can determine a related product via the video-to-product relationship 134. The recommendation engine 130 also can determine other products similar to the related product via the product-to-product relationships 126. Such a determination can be performed for each category (or, in some embodiments, at least one category) in the product-to-product relationships 126. Therefore, for each category (or the at least one category), the recommendation engine 130 can determine a group of short-form videos associated with the related product and the other similar products using the product-to-video relationship 138. Thus, information indicative or otherwise representative of short-form videos within a defined category in the product-to-product relationships 126 can constitute media-to-media similarity information. The media-to-media similarity information can be arranged or otherwise cast as media-to-media relationships (e.g., many-to-many relationships, one-to-many relationships or one-to-one relationships).

The media-to-media relationships generated by the recommendation engine 130 can be arranged according to different categories 144. Rather than concatenating groups of short-form videos respectively associated with the different categories, in some embodiments, the recommendation engine 130 selects a short-form video from each of the groups of short-form videos in a defined order, and can generate a list of short-form videos by concatenating the selected short-form videos. In one aspect, such a selection can incorporate diversity into the video-to-video similarity information by interleaving the short-form videos available in the different categories. Stated differently, the interleaving can mix the short-form videos in each of the different categories, yielding a more varied (or diverse) arrangement of short-form videos. The recommendation engine 130 can provide information indicative or otherwise representative of such an arrangement. As illustrated in FIG. 1, such information can be embodied in or can constitute the asset-to-asset relationships 140 or other type of media-to-media similarity information 140, where the arrangement of short-form media assets (e.g., short-form videos) is represented as one or more arrangements 144. An asset-to-asset relationship of the asset-to-asset relationship 140 can be embodied in or can constitute a one-to-many relationship, a many-to-one relationship, or a many-to-many relationship, and may be referred to as a media-to-media relationship.

A short-form media asset in an arrangement of the arrangement(s) 144 can embody or can constitute a media asset recommendation specific to a defined short-form media asset. Thus, in at least some implementations, at least one of the short-form media assets in the arrangement(s) 144 can be provided as a media recommendation, or, in some embodiments, a media determination.

Figure 2:
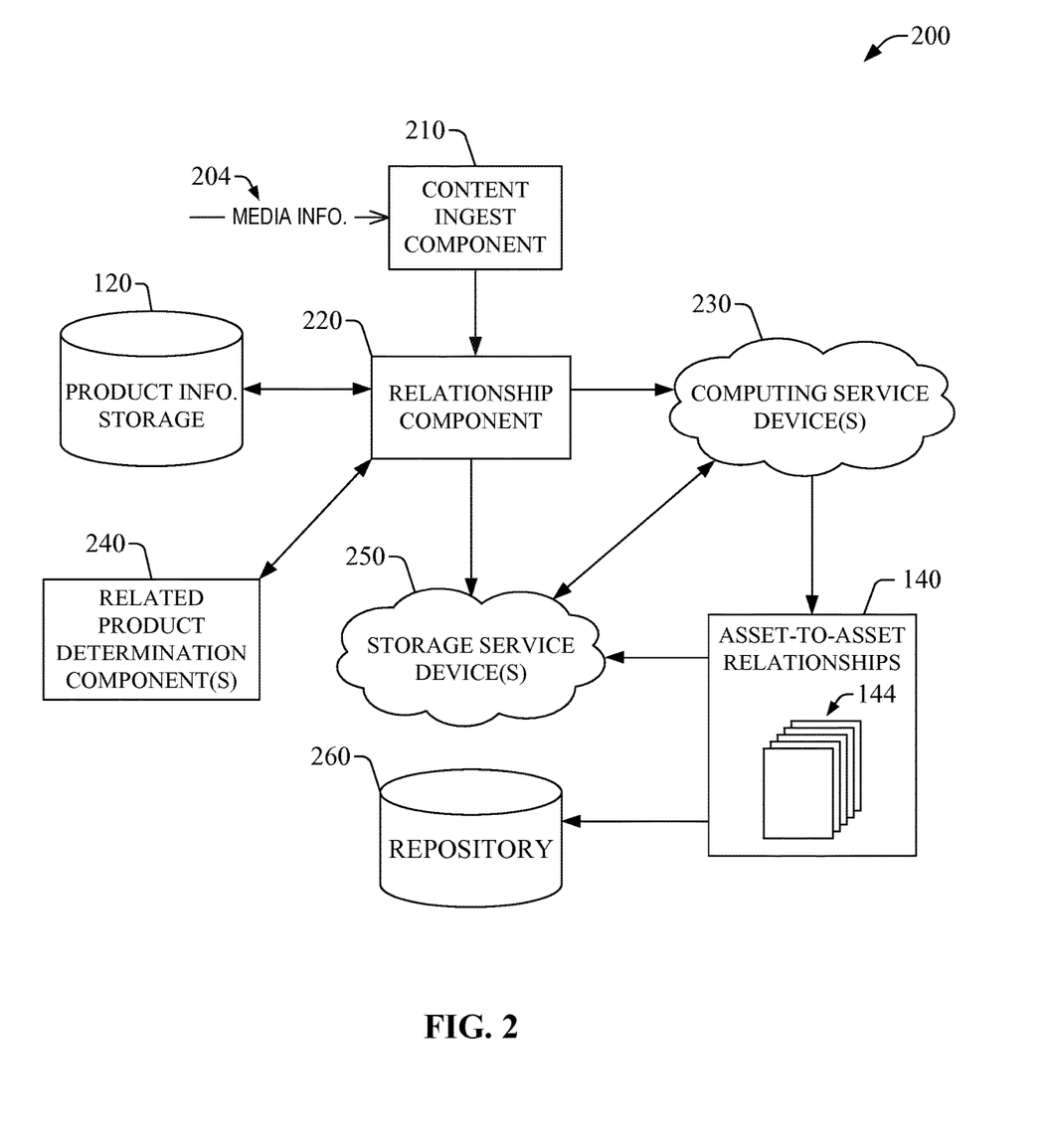
FIG. 2 presents another example of an operational environment in accordance with one or more embodiments of the disclosure.

FIG. 2 illustrates an example operational environment 200 for generation of recommendation for media assets using product information in accordance with one or more embodiments of the disclosure. As described herein, the product information can include product-to-product relationships or other types of product similarities. The example operational environment 200 can include one or more computational systems and can embody the recommendation engine 130 described in with respect to FIG. 1. The one or more computational systems can include networked computing devices that can provide the functionality described herein. As illustrated, a content ingest component 210 can receive media information 204 (e.g., metadata) representative or otherwise indicative of media assets, e.g., short-form videos, and product information 120 indicative or otherwise representative of product. The content ingest component 210 can constitute a content analysis workflow. The content ingest component 210 (which can include one or more communication components, including adapters, APIs, a combination thereof, or the like) can provide at least a portion of the information that is received to other components within the operational environment 200. More specifically, the content ingest component 210 can send at least a portion of the media information 204 to a relationship component 220 that can generate a media-to-product relationship in accordance with aspects of this disclosure. To that end, in some implementations, the relationship component 220 can receive the media information 204 and can determine (e.g., parse or otherwise extract) metadata representative of a media asset. As described herein, the metadata can include an asset identifier, asset title, asset genre, a combination thereof, or the like. In some embodiments, the relationship component 220 can compose or otherwise generate a search query including such metadata, and can search for products using the search query. In addition, the relationship component 220 can associate a result of the search with the media asset, and thus, generate a media-to-product relationship between the media asset and the product. The relationship component 220 can retain information indicative or otherwise representative of the media-to-product relationship within one or more storage service devices 250. In one implementation, such device(s) can embody or can constitute a distributed, cloud storage solution. The information indicative or otherwise representative of the media-to-product relationship can be retained, for example, as a flat file.

A media-to-product relationship can permit generating a product-to-media relationship. As described herein, in some embodiments, the product-to-media relationship can be generated by inverting the media-to-product relationship. To that end, in some embodiments, at least one device of computing service device(s) 230 can access or otherwise utilize the media-to-product relationship retained in the storage service device(s) 250 in order to determine the product-to-media relationship. Specifically, in one example, one or more inversion component(s) (not shown) within the computing service device(s) 230 can compute an inverse relationship for the media-to-product relationship. Such a computation can result in information representative or otherwise indicative of the product-to-media relationship. The computing service device(s) 230 can constitute a distributed, cloud computing solution. In some embodiments, the computing service device(s) 230 can include a cluster of host devices (e.g., server devices)

In addition, the operational environment 200 can include one or more related product determination components 240 that can provide information indicative or otherwise representative of products that are related or otherwise similar. The relationship component 220 can receive or otherwise access such information and can determine or otherwise generate a product-to-product relationship. The relationship component 220 can retain the product-to-product relationship in the storage service device(s) 250.

At least one device of the computing service device(s) 230 can access a product-to-product relationship and can utilize a generated product-to-media relationship in order to identify a group of media assets for such a defined similarity category. For a similarity category associated with the product-to-product relationship, the at least one device can identify media assets associated with products in the similarity category. The at least one device or other device(s) within the computing service device(s) 230 can identify or otherwise determine other media assets for other categories associated with the product-to-product relationship. Therefore, the computing service device(s) 230, via one or more component thereof, for example, can generate asset-to-asset relationships that can be representative of multiple groups of media assets for respective similarity categories. The computing service device(s) 230 can retain information indicative or otherwise representative of generated asset-to-asset relationships in one or more storage devices 260 (collectively referred to as repository 260). In certain embodiments, the information can be retained as a flat file.

Figure 3:
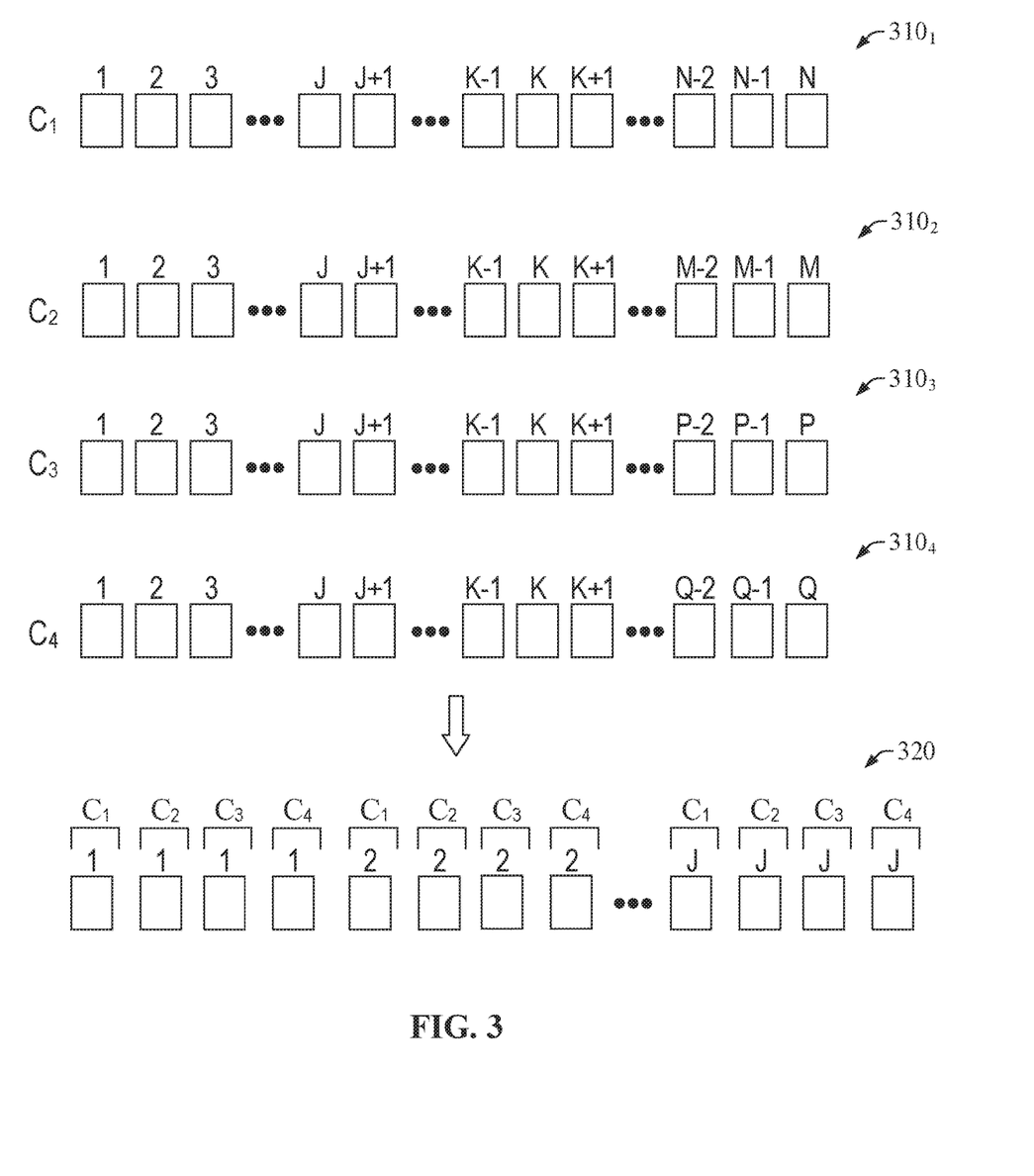
FIG. 3 illustrates a schematic representation of media recommendations in accordance with one or more embodiments of the disclosure.

As an illustration, FIG. 3 presents a diagram of groups $310_1$-$310_4$, each including a defined number of media assets (represented with a numbered block). Group $310_1$ is associated with category Ci and includes N (a natural number) media assets; group $310_2$ is associated with category C2 and includes M (a natural number) media assets; group $310_3$ is associated with category C3 and includes P (a natural number) media assets; and group $310_4$ is associated with category C4 and includes Q (a natural number) media assets. It is noted that in some embodiments, N, M, P, or Q can be equal to zero, in which case the respective category would not include a media asset. Category $C_i$, with i =1, 2, 3, 4, can be one of purchase similarity, consumption similarity, session similarity, and view-to-purchase similarity, for example. As described herein, in order to increase diversity, rather than generating a group of media assets by concatenating groups $310_1$-$310_4$, at least one of the computing service device(s) 230 can implement an interleaved selection of media assets from the groups $310_1$-$310_4$, and can generate a diverse group 320 of media assets by concatenating the results of such a selection until the media assets available for selection among the groups $310_1$-$310_4$ are exhausted. It is noted that, in some embodiments, the at least one of the computing service device(s) 230 can implement other types of selection rules besides interleaving (or interleaved selection). For instance, in one example of selection rule, the complete pool of media assets {1, 2, . . . , M-1, M-2, M; 1, 2, 3, . . . N-2, N-1, N; 1, 2, 3 . . . , P-2, P-1, P; 1, 2, 3 . . . Q-2, Q-1, Q} can be ranked according to a defined diversity criterion, and the resulting ranked list of media assets can represent asset-to-asset diversity. In addition or in another example of selection rule, a subset of the complete pool of media assets can be determined using a defined personalization criterion and the interleaved selection described herein can be applied to such a subset. A personalization criterion can be defined based on numerous factors, such as age group, ethnicity, personal interests, a combination thereof, or the like.

The diverse group 320 can embody or can include a media recommendation for the media asset associated with the groups $310_1$-$310_4$. Information indicative or otherwise representative of the diverse group 320 can embody or can constitute an asset-to-asset relationship (e.g., one or more of the asset-to-asset relationships 140) or other types of media asset similarity information. With further reference to FIG. 2, at least one of the computing service device(s) 230 can provide at least a portion of such information to an online system for consumption. In addition or in other embodiments, the at least one computing service device(s) 230 can provide at least a portion of the information indicative or otherwise representative of the diverse group 320 to a user device and/or other devices, such as a server device. The user device can present (e.g., display) at least the portion of the information.

Figure 4:
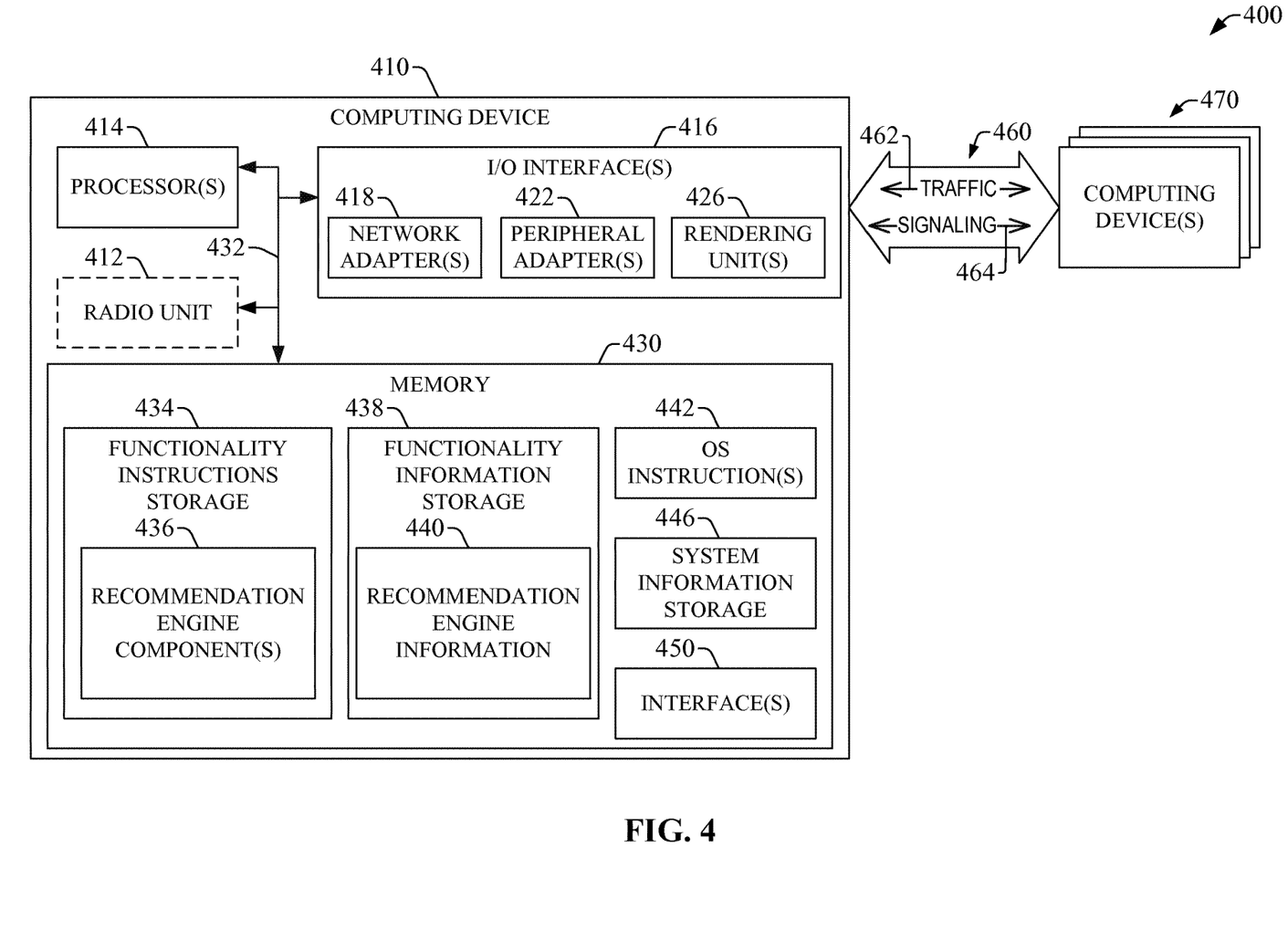
FIG. 4 illustrates an example of a computational environment for generation of media recommendations using product similarities in accordance with one or more embodiments of the disclosure.

FIG. 4 illustrates a block diagram of an example computational environment 400 for media recommendations using product information (such as product similarity information) in accordance with one or more aspects of the disclosure. As described herein, the media recommendation can include or can constitute a media determination. The example computational environment 400 is merely illustrative and is not intended to suggest or otherwise convey any limitation as to the scope of use or functionality of the computational environment's architecture. In addition, the illustrative computational environment depicted in FIG. 4 should not be interpreted as having any dependency or requirement relating to any one or combination of components illustrated in the example operational environments of the disclosure. The example computational environment 400 or portions thereof can embody or can include, for example, the operational environment 100 and/or the operational environment 200. As such, in some embodiments, the computing devices includes in the operational environment 400 can embody or can constitute a computational system that embodies functional elements (e.g., components, storage devices, and/or other types of devices included in the operational environment 100 and/or the operational environment 200.

The computational environment 400 represents an example implementation of the various aspects or features of the disclosure in which the processing or execution of operations described in connection with media determinations using product information disclosed herein can be performed in response to execution of one or more software components at the computing device 410. It should be appreciated that the one or more software components can render the computing device 410, or any other computing device that contains such components, a particular machine for generation of media determinations using product-to-product relationships as described herein, among other functional purposes. A software component can be embodied in or can comprise one or more computer-accessible instructions, e.g., computer-readable and/or computer-executable instructions. In one scenario, at least a portion of the computer-accessible instructions can embody and/or can be executed to perform at least a part of one or more of the example methods described herein, such as the example methods presented in FIGS. 5-7. For instance, to embody one such method, at least the portion of the computer-accessible instructions can be persisted (e.g., stored, made available, or stored and made available) in a computer storage non-transitory medium and executed by a processor. The one or more computer-accessible instructions that embody a software component can be assembled into one or more program modules, for example, that can be compiled, linked, and/or executed at the computing device 410 or other computing devices. Generally, such program modules comprise computer code, routines, programs, objects, components, information structures (e.g., data structures and/or metadata structures), etc., that can perform particular tasks (e.g., one or more operations) in response to execution by one or more processors, which can be integrated into the computing device 410 or functionally coupled thereto.

The various example embodiments of the disclosure can be operational with numerous other general purpose or special purpose computing system environments or configurations. Examples of well-known computing systems, environments, and/or configurations that can be suitable for implementation of various aspects or features of the disclosure in connection with the generation of media determinations (e.g., recommendations) using product similarity information (e.g., product-to-product relationships) described herein can comprise personal computers; server computers; laptop devices; handheld computing devices, such as mobile tablets or electronic-book readers (e-readers); wearable computing devices; and multiprocessor systems. Additional examples can include set-top boxes, programmable consumer electronics, network personal computers (PCs), minicomputers, mainframe computers, blade computers, programmable logic controllers, distributed computing environments that comprise any of the above systems or devices, and the like.

As illustrated, the computing device 410 can comprise one or more processors 414, one or more input/output (I/O) interfaces 416, a memory 430, and a bus architecture 432 (also termed bus 432) that functionally couples various functional elements of the computing device 410. In certain embodiments, the computing device 410 can include, optionally, a radio unit 412. The radio unit 412 can include one or more antennas and a communication processing unit that can permit wireless communication between the computing device 410 and another device, such as one of the computing device(s) 470. The bus 432 can include at least one of a system bus, a memory bus, an address bus, or a message bus, and can permit exchange of information (data, metadata, and/or signaling) between the processor(s) 414, the I/O interface(s) 416, and/or the memory 430, or respective functional elements therein. In certain scenarios, the bus 432 in conjunction with one or more internal programming interfaces 450 (also referred to as interface(s) 450) can permit such exchange of information. In scenarios in which processor(s) 414 include multiple processors, the computing device 410 can utilize parallel computing.

The I/O interface(s) 416 can permit communication of information between the computing device and an external device, such as another computing device, e.g., a network element or an end-user device. Such communication can include direct communication or indirect communication, such as exchange of information between the computing device 410 and the external device via a network or elements thereof. As illustrated, the I/O interface(s) 416 can comprise one or more of network adapter(s) 418, peripheral adapter(s) 422, and rendering unit(s) 426. Such adapter(s) can permit or facilitate connectivity between the external device and one or more of the processor(s) 414 or the memory 430. For example, the peripheral adapter(s) 422 can include a group of ports, which can include at least one of parallel ports, serial ports, Ethernet ports, V.35 ports, or X.21 ports. In certain embodiments, the parallel ports can comprise General Purpose Interface Bus (GPIB), IEEE-1284, while the serial ports can include Recommended Standard (RS)-232, V.11, Universal Serial Bus (USB), FireWire or IEEE-1394.

In one aspect, at least one of the network adapter(s) 418 can functionally couple the computing device 410 to one or more computing devices 470 via one or more traffic and signaling link 460 (wireline and/or wireless) that can permit or facilitate exchange of traffic 462 and signaling 464 between the computing device 410 and the one or more computing devices 470. Such network coupling provided at least in part by the at least one of the network adapter(s) 418 can be implemented in a wired environment, a wireless environment, or both. The information that is communicated by the at least one of the network adapter(s) 418 can result from the implementation of one or more operations of a method in accordance with aspects of this disclosure. Such output can be any form of visual representation, including, but not limited to, textual, graphical, animation, audio, tactile, and the like. In certain scenarios, each of the computing device(s) 470 can have substantially the same architecture as the computing device 410, and also can include components, such as recommendation engine component(s) 436, and/or information, such as recommendation engine information 440, that can permit one or more of the remote devices to implement (e.g., compute or otherwise perform) at least some of the functionality associated with generation of media-to-media relationships (or asset-to-asset relationships) in accordance with aspects described herein. In addition or in the alternative, the rendering unit(s) 426 can include functional elements (e.g., lights, such as light-emitting diodes; a display, such as a liquid crystal display (LCD), a plasma monitor, a light emitting diode (LED) monitor, or an electrochromic monitor; combinations thereof; or the like) that can permit control of the operation of the computing device 410, or can permit conveying or revealing the operational conditions of the computing device 410.

In one aspect, the bus 432 represents one or more of several possible types of bus structures, including a memory bus or a memory controller, a peripheral bus, an accelerated graphics port, and a processor or local bus using any of a variety of bus architectures. As an illustration, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnects (PCI) bus, a PCI-Express bus, a Personal Computer Memory Card International Association (PCMCIA) bus, a Universal Serial Bus (USB), and the like. The bus 432, and all buses described herein can be implemented over a wired or wireless network connection and each of the subsystems, including the processor(s) 414, the memory 430 and memory elements therein, and the I/O interface(s) 416 can be contained within one or more remote computing devices 470 at physically separate locations, connected through buses of this form, in effect implementing a fully distributed system. In certain embodiments, such a distributed system can implement the functionality described herein in connection with generating media-to-media relationships in a client-host or client-server configuration in which the recommendation engine component(s) 436 or the recommendation engine information 440, or both, can be distributed between the computing device 410 and at least one of the computing device(s) 470, and the computing device 410 and at least one of the computing device(s) 470 can execute such components and/or leverage such information. In certain implementation of a client-server embodiment, a client computing device can include one or more of the recommendation engine component(s) 436 embodying or constituting at least one of the relationship component 220 or the content ingest component 210, and forming a client for generation of media-to-product relationships, product-to-product relationships, and/or media-to-media relationships in accordance with aspects of this disclosure. Similarly, a server computing device can include one or more of the recommendation engine component(s) 436 embodying or constituting at least one of the computing service device(s) 230, the storage service device(s) 250, the repository 260, related product determination component(s) 240, and product information storage 120, and forming a server system providing services, storage functionality, and/or information to the relationship component 220, for example, in accordance with aspects of this disclosure. In some embodiments, one of the remote computing devices 470 or the computing device 410 can embody or can include the content ingest component 210. It is noted that the computing device 410 and at least a portion of the computing device(s) 470 can be combined in numerous way in order to embody a computing system, such as operational environment 200, that can implement the functionality described herein in connection with media determinations using product information.

The computing device 410 can comprise a variety of computer-readable media. Computer-readable media can be any available media (transitory and non-transitory) that can be accessed by a computing device. In one aspect, computer-readable media can comprise computer non-transitory storage media (or computer-readable non-transitory storage media) and communications media. Example computer-readable non-transitory storage media can be any available media that can be accessed by the computing device 410, and can comprise, for example, both volatile and non-volatile media, and removable and/or non-removable media. In one aspect, the memory 430 can comprise computer-readable media in the form of volatile memory, such as random access memory (RAM), and/or non-volatile memory, such as read-only memory (ROM).

The memory 430 can comprise functionality instructions storage 434 and functionality information storage 438. The functionality instructions storage 434 can comprise computer-accessible instructions that, in response to execution (by at least one of the processor(s) 414), can implement one or more of the functionalities of the disclosure. The computer-accessible instructions can embody or can comprise one or more software components illustrated as recommendation engine component(s) 436. In one scenario, execution of at least one component of the recommendation engine component(s) 436 can implement one or more of the methods described herein, such as example methods 500, 600, and/or 700. For instance, such execution can cause a processor (e.g., one of the processor(s) 414) that executes the at least one component to carry out a disclosed example method. It should be appreciated that, in one aspect, a processor of the processor(s) 414 that executes at least one of the recommendation engine component(s) 436 can retrieve information from or retain information in one or more memory elements 440 in the functionality information storage 438 in order to operate in accordance with the functionality programmed or otherwise configured by the recommendation engine component(s) 436. The one or more memory elements 440 may be referred to as recommendation engine information 440. Such information can include at least one of code instructions, information structures, or the like. For instance, at least a portion of such information structures can be indicative of tables indicative or representative of media-to-product relationships, product-to-media relationships, product-to-product relationships; ranking criteria; personalization criteria; and/or selection rules that can permit generation of media determinations using product-to-product relationships in accordance with aspects of this disclosure.

In certain embodiments, one or more of the recommendation engine component(s) 436 can embody or can constitute at least one of the location configuration unit, the security configuration unit, or the advertisement configuration unit, and can provide the functionality of such units in accordance with aspects of this disclosure. In other embodiments, one or more of the recommendation engine component(s) 436 in combination with at least one of the processor(s) 414 can embody or can constitute at least one of the location configuration unit, the security configuration unit, or the advertisement configuration unit, and can provide the functionality of such units in accordance with aspects of this disclosure.

At least one of the one or more interfaces 450 (e.g., application programming interface(s)) can permit or facilitate communication of information between two or more components within the functionality instructions storage 434. The information that is communicated by the at least one interface can result from implementation of one or more operations in a method of the disclosure. In certain embodiments, one or more of the functionality instructions storage 434 and the functionality information storage 438 can be embodied in or can comprise removable/non-removable, and/or volatile/non-volatile computer storage media.

At least a portion of at least one of the recommendation engine component(s) 436 or recommendation engine information 440 can program or otherwise configure one or more of the processors 414 to operate at least in accordance with the functionality described herein. One or more of the processor(s) 414 can execute at least one of the recommendation engine component(s) 436 and leverage at least a portion of the information in the functionality information storage 438 in order to provide generation of media recommendations using product-to-product relationships or other type of product similarity information in accordance with one or more aspects described herein.

It should be appreciated that, in certain scenarios, the functionality instruction(s) storage 434 can embody or can comprise a computer-readable non-transitory storage medium having computer-accessible instructions that, in response to execution, cause at least one processor (e.g., one or more of the processor(s) 414) to perform a group of operations comprising the operations or blocks described in connection with the disclosed methods.

In addition, the memory 430 can comprise computer-accessible instructions and information (e.g., data, metadata, and/or programming code instructions) that permit or facilitate the operation and/or administration (e.g., upgrades, software installation, any other configuration, or the like) of the computing device 410. Accordingly, as illustrated, the memory 430 can comprise a memory element 442 (labeled operating system (OS) instruction(s) 442) that contains one or more program modules that embody or include one or more operating systems, such as Windows operating system, Unix, Linux, Symbian, Android, Chromium, and substantially any OS suitable for mobile computing devices or tethered computing devices. In one aspect, the operational and/or architectural complexity of the computing device 410 can dictate a suitable OS. The memory 430 also comprises a system information storage 446 having data, metadata, and/or programming code that permits or facilitates the operation and/or administration of the computing device 410. Elements of the OS instruction(s) 442 and the system information storage 446 can be accessible or can be operated on by at least one of the processor(s) 414.

It should be recognized that while the functionality instructions storage 434 and other executable program components, such as the OS instruction(s) 442, are illustrated herein as discrete blocks, such software components can reside at various times in different memory components of the computing device 410, and can be executed by at least one of the processor(s) 414. In certain scenarios, an implementation of the recommendation engine component(s) 436 can be retained on or transmitted across some form of computer-readable media.

The computing device 410 and/or one of the computing device(s) 470 can include a power supply (not shown), which can power up components or functional elements within such devices. The power supply can be a rechargeable power supply, e.g., a rechargeable battery, and it can include one or more transformers to achieve a power level suitable for the operation of the computing device 410 and/or one of the computing device(s) 470, and components, functional elements, and related circuitry therein. In certain scenarios, the power supply can be attached to a conventional power grid to recharge and ensure that such devices can be operational. In one aspect, the power supply can include an I/O interface (e.g., one of the network adapter(s) 418) to connect operationally to the conventional power grid. In another aspect, the power supply can include an energy conversion component, such as a solar panel, to provide additional or alternative power resources or autonomy for the computing device 410 and/or one of the computing device(s) 470.

The computing device 410 can operate in a networked environment by utilizing connections to one or more remote computing devices 470. As an illustration, a remote computing device can be a personal computer, a portable computer, a server, a router, a network computer, a peer device or other common network node, and so on. As described herein, connections (physical and/or logical) between the computing device 410 and a computing device of the one or more remote computing devices 470 can be made via one or more traffic and signaling pipes 460, which can comprise wired link(s) and/or wireless link(s) and several network elements (such as routers or switches, concentrators, servers, and the like) that form a local area network (LAN), a wide area network (WAN), and/or other networks (wireless or wired) having different footprints. Such networking environments are conventional and commonplace in dwellings, offices, enterprise-wide computer networks, intranets, local area networks, and wide area networks.

In one or more embodiments, one or more of the disclosed methods can be practiced in distributed computing environments, such as grid-based environments, where tasks can be performed by remote processing devices (computing device(s) 470) that are functionally coupled (e.g., communicatively linked or otherwise coupled) through a network having traffic and signaling pipes and related network elements. In a distributed computing environment, in one aspect, one or more software components (such as program modules) can be located in both a local computing device 410 and at least one remote computing device.

Figure 5:
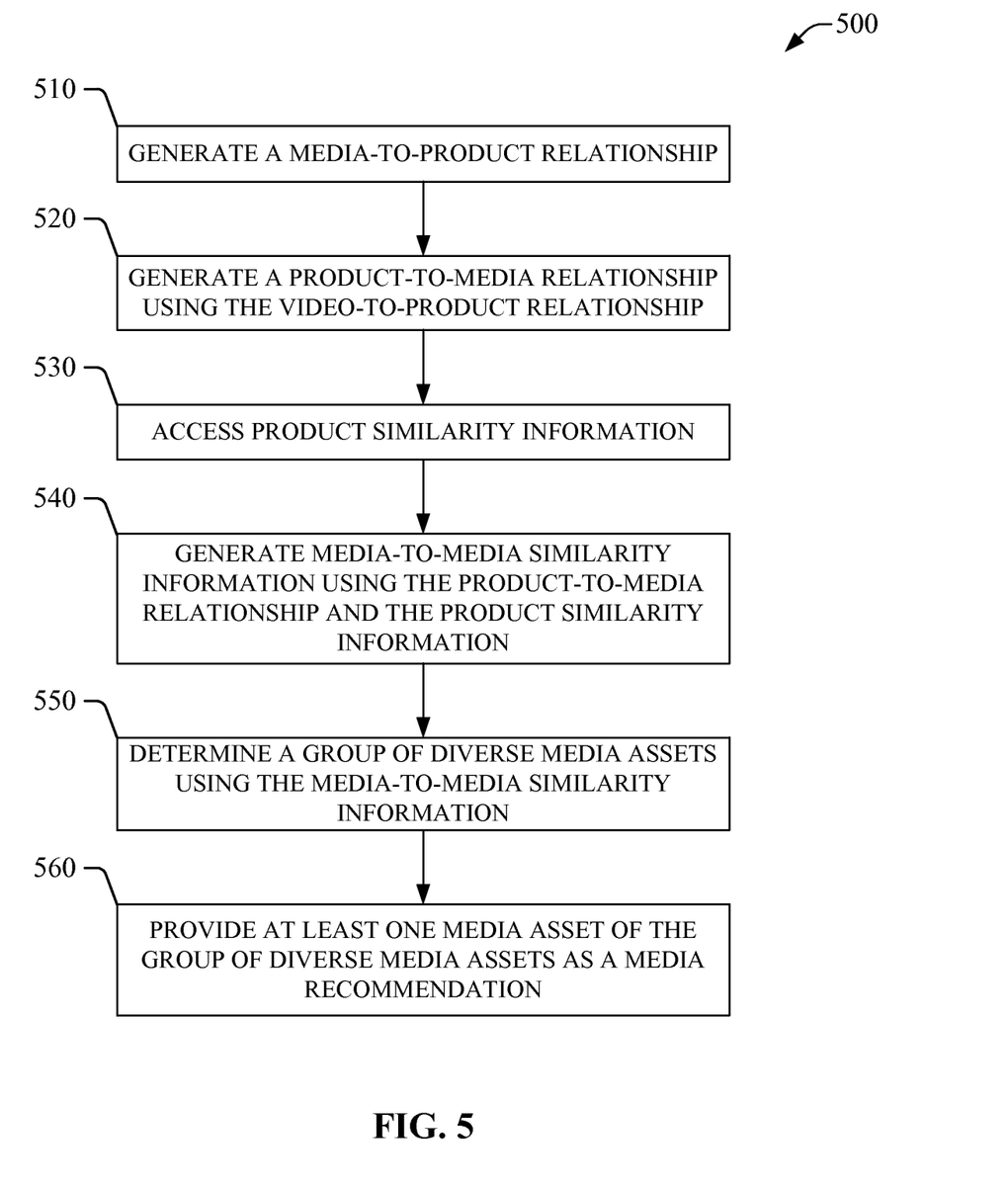
FIGS. 5-7 present examples of methods according to one or more embodiments of the disclosure.
Figure 6:
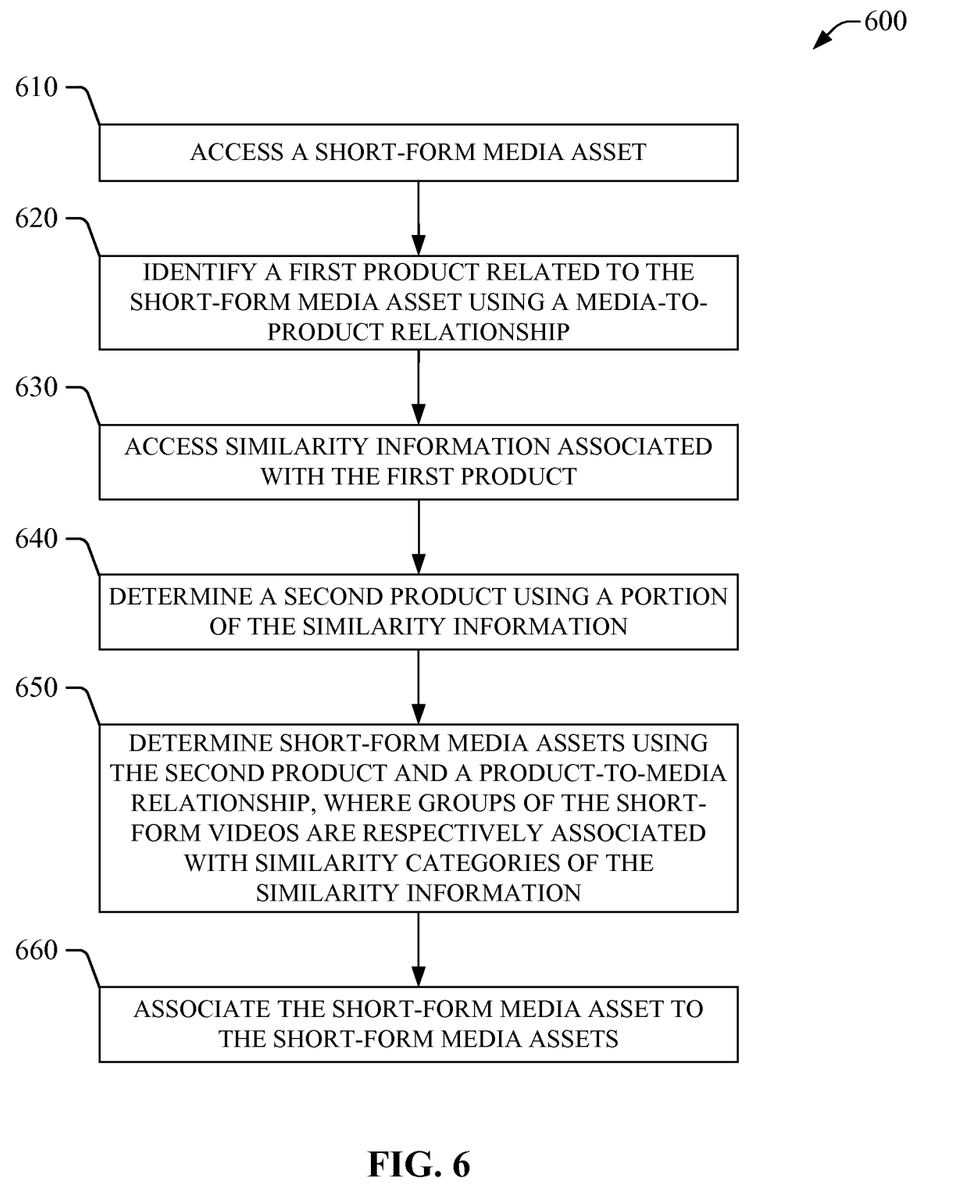
Figure 7:
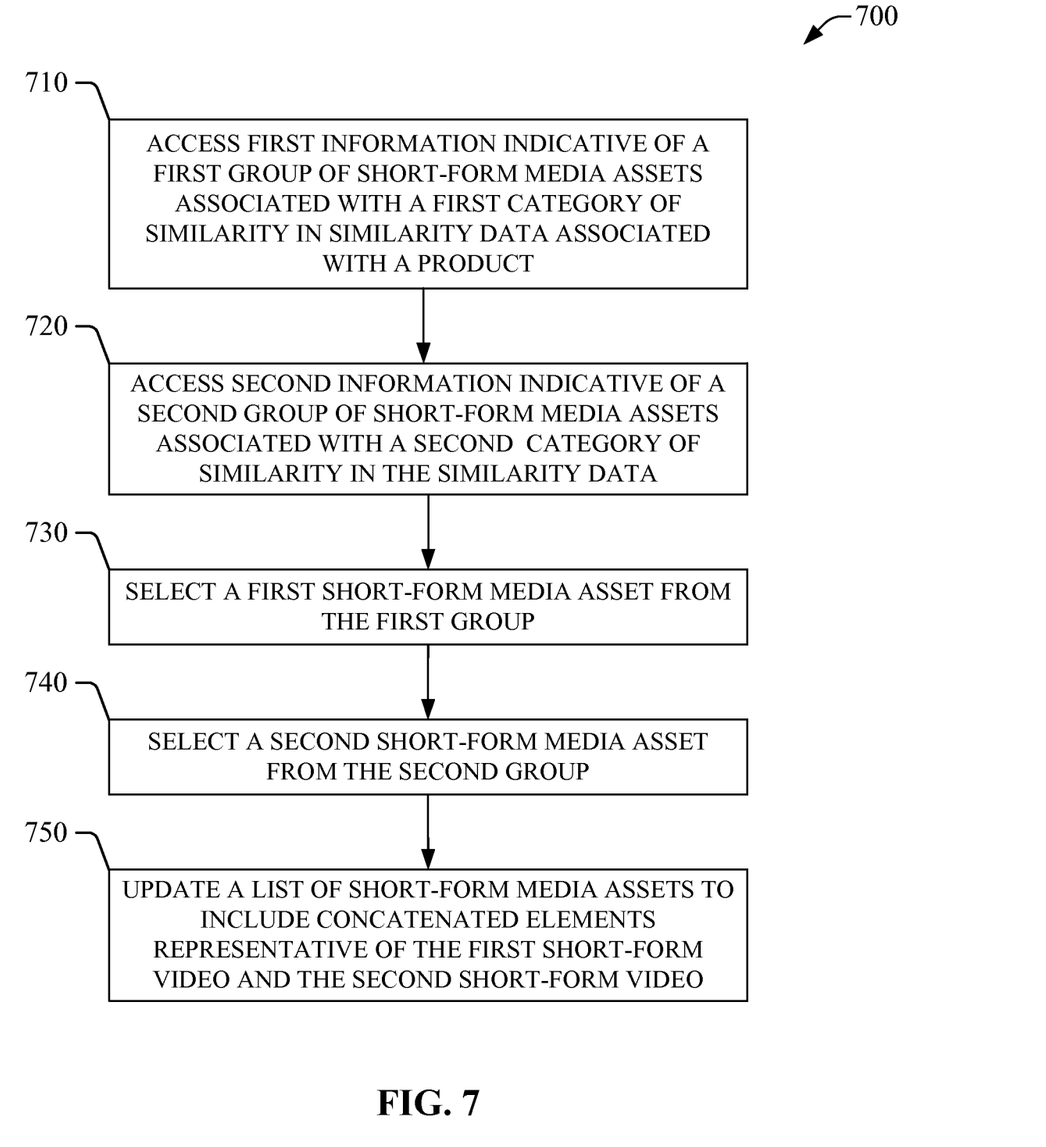

In view of the aspects of the disclosure described herein, example methods that can be implemented in accordance with the disclosure can be more readily appreciated with reference to the flowcharts in FIGS. 5-7. For purposes of simplicity of explanation, the example methods disclosed herein are presented and described as a series of blocks (with each block representing an action or an operation in a method, for example). However, it is to be understood and appreciated that the disclosed methods are not limited by the order of blocks and associated actions or operations, as some blocks may occur in different orders and/or concurrently with other blocks from that are shown and described herein. For example, the various methods or processes of the disclosure can be alternatively represented as a series of interrelated states or events, such as in a state diagram. Furthermore, not all illustrated blocks, and associated action(s), may be required to implement a method in accordance with one or more aspects of the disclosure. Further yet, two or more of the disclosed methods or processes can be implemented in combination with each other, to accomplish one or more features or advantages described herein.

It is noted that the methods of the disclosure can be retained on an article of manufacture, or computer-readable medium, to permit or facilitate transporting and transferring such methods to a computing device (e.g., a desktop computer; a mobile computer, such as an electronic book reader (e-reader) or other tablets, or a smartphone; a gaming console, a mobile telephone; a blade computer; a programmable logic controller, and the like) for execution, and thus implementation, by a processor of the computing device or for storage in a memory thereof or functionally coupled thereto. In one aspect, one or more processors, such as processor(s) that implement (e.g., execute) one or more of the disclosed methods, can be employed to execute code instructions retained in a memory, or any computer- or machine-readable medium, to implement the one or more methods. The code instructions can provide a computer-executable or machine-executable framework to implement the methods described herein.

FIG. 5 is a flowchart of an example method 500 for generating media determinations according to one or more embodiments of the disclosure. As described herein, a media determination refers to a determination of a defined media asset, and, in at least some embodiments, the media determination also may be referred to as a media recommendation. In some embodiments, a computing system that has at least one processor and/or is functionally coupled to at least one processor can implement (e.g., compile, execute, compile and execute, etc.) one or more blocks of the example method 500. In some scenarios, one or more blocks of the example method 500 can be implemented in a distributed fashion by two or more computing devices contained in the computing system. Each of the two or more computing devices can have at least one processor or can be functionally coupled to at least one processor, where such processor(s) can implement at least one of the one or more blocks. The computing system can be embodied in or can include, in some embodiments, the computational environment 400, which can embody or can include the operational environment 200, for example. The media assets in the example method 500 can include, for example, videos, such as short-form videos, songs, or other pieces of digital content. It is noted that while the example method 500 includes references to products, the example method 500 is not limited in this respect and, in some embodiments, the example method 500 can be implemented for any assets, digital or non-digital, for which asset-to-asset relationships or other type of asset similarity information is available.

At block 510, the computing system can generate a media-to-product relationship. At block 520, the computing system can generate a product-to-media relationship using the media-to-product relationship. It is noted that in some embodiments, the computing system can generate the product-to-media relationship without reliance on the media-to-product relationship. In some implementations, generating such relationships (or any other relationship described herein) can include generating tables or other types of information structures indicative or otherwise representative of the relationships. For instance, generating the media-to-product relationship can include generating pairs (ordered or otherwise) within a table representative of the media-to-product relationship. Similarly, generating the product-to-media relationship can include generating other pairs within another table representative of the product-to-media relationship. At block 530, the computing system can access product similarity information (e.g., one or more product-to-product relationships). The product similarity information can be arranged in similarity categories, each indicative or otherwise representative of product(s) having a specific type of similarity. As described herein, the categories can include, for example, purchase, perusal or consumption, session and view to purchase.

At block 540, the computing system can generate media-to-media similarity information (e.g., media-to-media relationships) using the product-to-media relationship and the product similarity information. In some embodiments, the product similarity information can permit identifying or otherwise determining a product similar to another product according to a defined similarity category, for example. In addition, the product-to-media relationship can permit identifying or otherwise determining media assets for such similar products. Specifically, in one example, the computing system can identify at least one first media asset (e.g., a short-form video) for the product and at least one second media asset (e.g., another short-form video) for the other product. In view that such products are similar according to the defined similarity category, the at least one first media asset and the at least one second media asset also can be characterized as similar. Thus, for products in a catalog (e.g., for each product in the catalog), the computing system can identify or otherwise determine media assets associated with similar products according to the defined similarity category. The media assets can be deemed similar according to the defined similarity category. The computing system can further identify or otherwise determine other media assets associated with other similar products according to another defined similarity category, and therefore, the other media assets also can be deemed similar according to the other defined category. The computing system can reiterate the identification or determination of similar media assets using other similarity categories that can be present in the product similarity information, resulting in respective categories of similar media assets. Information indicative or otherwise representative of the media assets in such categories can embody or otherwise constitute the media-to-media similarity information. As described herein, in some implementations, generating a media-to-media relationship (or asset-to-asset relationship) can include generating pairs (ordered or otherwise) within a table representative of the media-to-media relationship.

At block 550, the computing system can determine a group of diverse media assets using the media-to-media similarity information. As described herein, such a group can be determined in numerous ways, including utilizing or otherwise leveraging selection rules (e.g., interleaving), ranking criteria, and/or personalization criteria. At block 560, the computing system can provide at least one media asset of the group of diverse media assets as a media recommendation. As described herein, the computing system can provide the at least one media asset of a representation thereof to a user device and/or other type of devices (e.g., server devices). In addition or in some embodiments, providing the at least one media asset can include generating information indicative or otherwise representative of a user interface including marking representative of the at least one media asset. Thus, in some implementations, the computing system can provide the at least one media asset (or information representative thereof) and information indicative or otherwise representative of such a user interface.

FIG. 6 is a flowchart of an example method 600 for generating media-to-media similarity information according to one or more embodiments of the disclosure. As described herein, the media-to-media similarity information can embody or can include media-to-media relationships. In some embodiments, the example method 600 can embody or can constitute the block 540 of the example method 500. Similar to other methods described herein, a computing system that has at least one processor and/or is functionally coupled to at least one processor can implement (e.g., compile, execute, compile and execute, etc.) one or more blocks of the example method 600. In some scenarios, one or more blocks of the example method 600 can be implemented in a distributed fashion by two or more computing devices contained in the computing system. Each of the two or more computing devices can have at least one processor or can be functionally coupled to at least one processor, where such processor(s) can implement at least one of the one or more blocks. The computing system can be embodied in or can include, in some embodiments, the computational environment 400, which can embody or can include the operational environment 200, for example. Similarly to other methods described herein, it is noted that the media assets in the example method 600 can include, for example, videos, such as short-form videos, songs, or other pieces of digital content. It is also noted that while the example method 600 is described in connection with products, the example method 600 is not limited in this respect, and in some embodiments, the example method 600 can be implemented for any assets, digital or non-digital, for which asset-to-asset relationships or other type of asset similarity information is available.

At block 610, the computing device can access a short-form media asset. At block 620, the computing device can identify a first product related to the short-form media asset using an asset-to-product relationship. At block 630, the computing system can access similarity information associated with the first product. At block 640, the computing system can determine a second product using a portion of the similarity information. At block 650, the computing system can determine short-form media assets using the second product and a product-to-media relationship. As described herein, in some implementations, the groups of the short-form media assets are respectively associated with similarity categories of the similarity information. At block 660, the computing system can associate the short-form media asset to the short-form media assets. In some implementations, associating the short-form media asset to the short-form media assets can include generating and/or updating a list, a table, and/or other types of information structures. Generation and/or update of the list, the table, and/or the other information structures can include generation of records (single records, pair of records, etc.) and storage of such records.

FIG. 7 is a flowchart of an example method 700 for introducing diversity in a selection of short-form media assets according to one or more embodiments of the disclosure. In some embodiments, the example method 700 can embody or can constitute block 550 of the example method 500. Similar to other methods described herein, a computing system that has at least one processor and/or is functionally coupled to at least one processor can implement (e.g., compile, execute, compile and execute, etc.) one or more blocks of the example method 700. In some scenarios, one or more blocks of the example method 700 can be implemented in a distributed fashion by two or more computing devices contained in the computing system. Each of the two or more computing devices can have at least one processor or can be functionally coupled to at least one processor, where such processor(s) can implement at least one of the one or more blocks. The computing system can be embodied in or can include, in some embodiments, the computational environment 400, which can embody or can include the operational environment 200, for example. Similarly to other methods described herein, the short-form media assets in the example method 700 can include, for example, videos, such as short-form videos, songs, or other pieces of digital content. It is also noted that while the example method 700 is described in connection with short-form media assets and products, the example method is not limited in this respect, and in some embodiments, the example method 600 can be implemented for any media asset and, more generally, any type of assets, digital or non-digital (e.g., products or objects), for which asset-to-asset relationships or other type of asset similarity information is available.

At block 710, the computing system can access (e.g., receive) first information indicative or otherwise representative of a first group of short-form media assets associated with a first category of similarity in similarity data (e.g., a product-to-product relationship) associated with a product. At block 720, the computing system can access (e.g., receive) second information indicative or otherwise representative of a second group of short-form videos associated with a second category in the similarity data. In some embodiments, the elements of the first group and/or the second group can be previously selected according to a defined selection criterion, such as a personalization criterion. In addition or in other embodiments, the first group and/or the second group can be ranked or otherwise arranged according to a defined ranking criterion. As described herein, in some embodiments, the first information and the second information can constitute media-to-media similarity, as described herein, and can be retained in a database (relational or non-relational) or another type of information structure within one or more memory devices. At block 730, the computing system can select a first short-form media asset from the first group. At block 740, the computing system can select a second short-form media asset from the second group. As described herein, the computing system can select the first short-form media asset and/or the second short-form media asset according to a defined selection rule and/or a defined ranking criterion. At block 750, the computing system can update a list of short-form media assets to include concatenated elements indicative or otherwise representative of the first short-form media asset or the second short-form media asset. As described herein, in certain embodiments, the computing system can select a short-form media asset according to a selection rule, which can include one or more criteria for identification of short-form media asset from a group.

The disclosed operational environments (e.g., system(s), device(s), etc.) and methods may take the form of an entirely hardware embodiment, an entirely software embodiment, or an embodiment combining hardware and software features. Furthermore, the methods and systems may take the form of a computer program product on a computer-readable non-transitory storage medium having computer-accessible instructions (e.g., computer-readable and/or computer-executable instructions), such as computer software, embodied in the computer-readable non-transitory storage medium. Any suitable computer non-transitory storage medium may be utilized to form the computer program product.

Embodiments of the operational environments and methods are described herein with reference to block diagrams and flowchart illustrations of methods, systems, apparatuses and computer program products. It can be understood that each block of the block diagrams and flowchart illustrations, and combinations of blocks in the block diagrams and flowchart illustrations, respectively, can be implemented by computer-accessible instructions. In certain implementations, the computer-accessible instructions may be loaded or otherwise incorporated into a general purpose computer, special purpose computer, or other programmable information processing apparatus to produce a particular machine, such that the operations or functions specified in the flowchart block or blocks can be implemented in response to execution at the computer or processing apparatus.

Unless otherwise expressly stated, it is in no way intended that any protocol, procedure, process, or method set forth herein be construed as requiring that its acts or steps be performed in a specific order. Accordingly, where a process or method claim does not actually recite an order to be followed by its acts or steps or it is not otherwise specifically recited in the claims or descriptions of the subject disclosure that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification or annexed drawings, or the like.

As used in this application, the terms "component," "environment," "system," "architecture," "interface," "unit," "engine," "module," and the like are intended to refer to a computer-related entity or an entity related to an operational apparatus with one or more specific functionalities. Such entities may be either hardware, a combination of hardware and software, software, or software in execution. As an example, a component may be, but is not limited to being, a process running on a processor, a processor, an object, an executable portion of software, a thread of execution, a program, and/or a computing device. For example, both a software application executing on a computing device and the computing device can be a component. One or more components may reside within a process and/or thread of execution. A component may be localized on one computing device or distributed between two or more computing devices. As described herein, a component can execute from various computer-readable non-transitory media having various data structures stored thereon. Components can communicate via local and/or remote processes in accordance, for example, with a signal (either analogic or digital) having one or more data packets (e.g., data from one component interacting with another component in a local system, distributed system, and/or across a network such as a wide area network with other systems via the signal). As another example, a component can be an apparatus with specific functionality provided by mechanical parts operated by electric or electronic circuitry that is controlled by a software application or firmware application executed by a processor, wherein the processor can be internal or external to the apparatus and can execute at least a part of the software or firmware application. As yet another example, a component can be an apparatus that provides specific functionality through electronic components without mechanical parts, the electronic components can include a processor therein to execute software or firmware that confers at least in part the functionality of the electronic components. An interface can include input/output (I/O) components as well as associated processor, application, and/or other programming components. The terms "component," "environment," "system," "architecture," "interface," "unit," "engine," "module" can be utilized interchangeably and can be referred to collectively as functional elements.

In the present specification and annexed drawings, reference to a "processor" is made. As utilized herein, a processor can refer to any computing processing unit or device comprising single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit (IC), an application-specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. A processor can be implemented as a combination of computing processing units. In certain embodiments, processors can utilize nanoscale architectures such as, but not limited to, molecular and quantum-dot based transistors, switches and gates, in order to optimize space usage or enhance performance of user equipment.

In addition, in the present specification and annexed drawings, terms such as "store," "storage," "data store," "data storage," "memory," "repository," and substantially any other information storage component relevant to operation and functionality of a component of the disclosure, refer to "memory components," entities embodied in a "memory," or components forming the memory. It can be appreciated that the memory components or memories described herein embody or comprise non-transitory computer storage media that can be readable or otherwise accessible by a computing device. Such media can be implemented in any methods or technology for storage of information such as computer-readable instructions, information structures, program modules, or other information objects. The memory components or memories can be either volatile memory or non-volatile memory, or can include both volatile and non-volatile memory. In addition, the memory components or memories can be removable or non-removable, and/or internal or external to a computing device or component. Example of various types of non-transitory storage media can comprise hard-disc drives, zip drives, CD-ROM, digital versatile disks (DVD) or other optical storage, magnetic cassettes, magnetic tape, magnetic disk storage or other magnetic storage devices, flash memory cards or other types of memory cards, cartridges, or any other non-transitory medium suitable to retain the desired information and which can be accessed by a computing device.

As an illustration, non-volatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory components or memories of operational environments described herein are intended to comprise one or more of these and/or any other suitable types of memory.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, and techniques that can provide recommendations for media assets based on product similarities. It is, of course, not possible to describe every conceivable combination of elements and/or methods for purposes of describing the various features of the disclosure, but it can be recognize that many further combinations and permutations of the disclosed features are possible. Accordingly, it may be apparent that various modifications can be made to the disclosure without departing from the scope or spirit thereof. In addition or in the alternative, other embodiments of the disclosure may be apparent from consideration of the specification and annexed drawings, and practice of the disclosure as presented herein. It is intended that the examples put forward in the specification and annexed drawings be considered, in all respects, as illustrative and not restrictive. Although specific terms are employed herein, they are used in a generic and descriptive sense only and not for purposes of limitation.

What is claimed is:
1. A method, comprising:
   receiving, by one or more processors coupled to memory, media information indicative of a first set of media assets;

parsing, by the one or more processors, metadata from the media information;

generating, by the one or more processors, a search query comprising a regular expression including the parsed metadata;

identifying, by the one or more processors, a first product using the search query;

associating, by the one or more processors, a portion of the parsed metadata with second metadata associated with the first product;

generating, by the one or more processors, based on the association, a media-asset-to-product relationship between the first set of media assets and the first product;

generating, by the one or more processors, a product-to-media-asset relationship between the first product and the first set of media assets using the media-asset-to-product relationship, wherein the generating the product-to-media-asset relationship comprises generating an inverse relationship of the media-asset-to-product relationship;

receiving, by the one or more processors, first similarity information representative of a product-to-product relationship between the first product and a second product, wherein the product-to-product relationship associates the first product and the second product according to at least one similarity type and the second metadata;

generating, by the one or more processors, using the first similarity information and the product-to-media-asset relationship, second similarity information representative of a media-asset-to-media-asset relationship, wherein the media-asset-to-media-asset relationship associates the first set of media assets to a second set of media assets based on the parsed metadata;

determining, by the one or more processors, a first group of the second set of media assets associated with a first similarity category of the second similarity information, wherein the first group comprises a first media asset and a second media asset;

determining, by the one or more processors, a second group of the second set of media assets associated with a second similarity category of the second similarity information, wherein the second group comprises a third media asset and a fourth media asset;

determining, by the one or more processors, based on a first criterion, a first order of media assets of the first group, wherein the first media asset is before the second media asset;

determining, by the one or more processors, based on a second criterion, a second order of media assets of the second group, wherein the third media asset is before the fourth media asset;

determining, by the one or more processors, a first selection of media assets comprising the first media asset and the third media asset and a second selection of media assets comprising the second media asset and the fourth media asset; and generating, by the one or more processors, a recommendation comprising the first selection of media assets and the second selection of media assets for presentation at a user device, wherein the first selection of media assets is presented before the second selection of media assets.

2. The method of claim 1, wherein the generating the second similarity information comprises
determining a third product related to the second product according to a portion of the first similarity information.

3. The method of claim 2, wherein the generating the second similarity information further comprises identifying the second set of media assets for the third product using the product-to-media-asset relationship;
generating an association between the first set of media assets and the second set of media assets; and
updating a similarity category of the second similarity information with the association.

4. The method of claim 1, further comprising providing information representative of at least one media asset of the first media asset, the second media asset, the third media asset, and the fourth media asset, the information represents a recommendation associated with the first set of media assets.

5. The method of claim 1, further comprising:
accessing first information indicative of the first group associated with the first similarity category in the second similarity information; and
accessing second information indicative of the second group associated with the second similarity category in the second similarity information.

6. The method of claim 5, wherein the determining the first media selection of media assets and the second selection of media assets further comprises updating a list to include concatenated elements respectively representative of the first media asset, the second media asset, the third media asset and the fourth media asset.

7. A system, comprising:
at least one memory device having computer-executable instructions; and
at least one processor coupled to the at least one memory device and configured, by the computer-executable instructions, to:
receive media information indicative of a first set of media assets;
parse metadata from the media information;
generate a search query comprising a regular expression including the parsed metadata;
identify a first product using the search query;
associate a portion of the parsed metadata with second metadata associated with the first product;
generate, based on the association, a media-asset-to-product relationship between the first set of media assets and the first product;
generate a product-to-media-asset relationship between the first product and the first set of media assets using the media-asset-to-product relationship, wherein generation of the product-to-media-asset relationship comprises generation of an inverse relationship of the media-asset-to-product relationship;
receive first similarity information representative of an association relating the first product and a second product, wherein the association represents a similarity type between the first product and the second product and the second metadata;
generate using the first similarity information and the product-to-media-asset relationship, second similarity information representative of a media-asset-to-media-asset relationship, wherein the media-asset-to-media-asset relationship associates the first set of media assets to a second set of media assets based on the parsed metadata;

determine a first group of the second set of media assets associated with a first similarity category of the second similarity information, wherein the first group comprises a first media asset and a second media asset;

determine a second group of the second set of media assets associated with a second similarity category of the second similarity information, wherein the second group comprises a third media asset and a fourth media asset;

determine, based on a first criterion, a first order of media assets of the first group, wherein the first media asset is before the second media asset;

determine, based on a second criterion, a second order of media assets of the second group, wherein the third media asset is before the fourth media asset;

determine a first selection of media assets comprising the first media asset and the third media asset, and a second selection of media assets comprising the second media asset and the fourth media asset; and generate a recommendation comprising the first selection of media assets and the second selection of media assets for presentation at a user device, wherein the first selection of media assets is presented before the second selection of media assets.

8. The system of claim 7, wherein the at least one processor is further configured to determine a third product related to the second product according to a portion of the first similarity information.

9. The system of claim 8, wherein the at least one processor is further configured to identify the second set of media assets for the third product using the product-to-media-asset relationship;

to generating an association between the first set of media assets and the second set of media assets; and to update a similarity category of the second similarity information with the association.

10. The system of claim 7, wherein the at least one processor is further configured to provide information representative of at least one media asset of the first media asset, the second media asset, the third media asset, and the fourth media asset, the information represents a recommendation associated with the first set of media assets.

11. The system of claim 7, wherein the at least one processor is further configured to access first information indicative of the first group associated with the first similarity category in the second similarity information; and to access second information indicative of the second group associated with the second similarity category in the second similarity information.

12. The system of claim 11, wherein the at least one processor is further configured to update a list to include concatenated elements respectively representative of the first media asset, the second media asset, the third media asset and the fourth media asset.

* * * * *